R. P. THIAN.
Stamp Affixers.
No. 142,822.
Patented September 16, 1873.
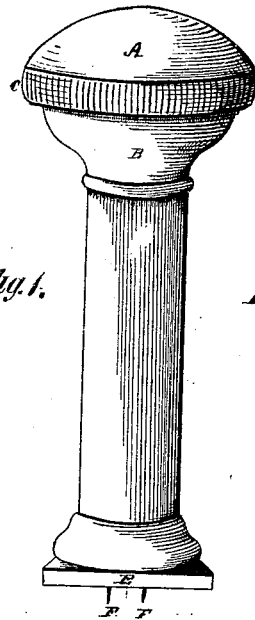
Fig. 1.
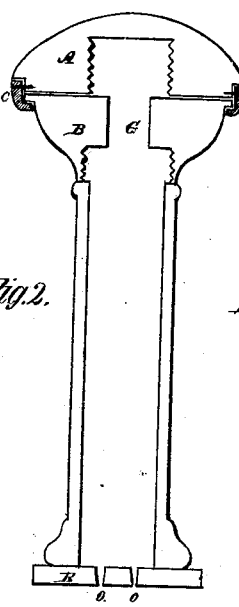
Fig. 2.
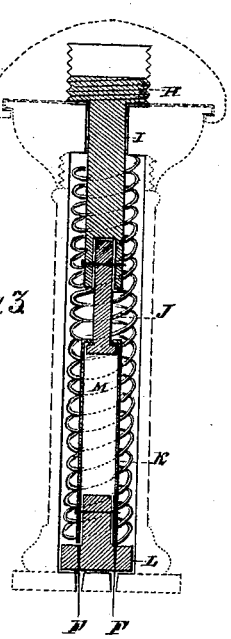
Fig. 3.
Fig. 4.
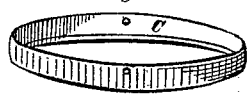
Fig. 7.
Fig. 9.
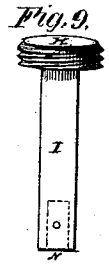
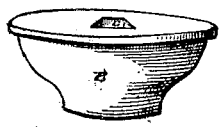
Fig. 5.
Fig. 8.
Fig. 12.
Fig. 10.
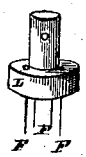
Fig. 13.
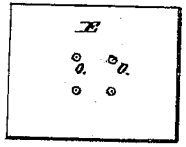
Fig. 6.
Fig. 11.
WITNESSES
INVENTOR

UNITED STATES PATENT OFFICE.

RAPHAEL P. THIAN, OF GEORGETOWN, DISTRICT OF COLUMBIA.

IMPROVEMENT IN STAMP-AFFIXERS.

Specification forming part of Letters Patent No. 142,822, dated September 16, 1873; application filed August 20, 1873.

*To all whom it may concern:*

Be it known that I, RAPHAEL P. THIAN, of Georgetown, District of Columbia, have invented a Stamp-Affixer for placing stamps upon letters, newspapers, and all other mailable matter, as well as upon miscellaneous packages requiring revenue-stamps, of which the following is a specification:

The object of my invention is to rapidly, and without touching them with the hands, place stamps on letters, packages, &c. This is accomplished by picking up the stamp with the projecting needles F F, of which there are four, as shown by Figs. 6 and 13. The stamp thus held by the needles is then dampened by being slightly pressed on a wet sponge, and finally placed on the letter or package, the plate E pressing it down, while, by the pressure, the needles are forced upward and clear of the stamp, which action is controlled by the cylinder and spiral spring, as shown by Fig. 3. The cylinder and rods shown by Fig. 3 are thus explained: H and I, Figs. 3 and 9, is a square rod with threaded head, which, being attached to a smaller rod, J, fitting within the cylinder K, forms a controlling-rod by which the needles, which are fastened in a plate, L, (said plate being attached to the lower end of the cylinder,) are raised clear of the face of the plate E, and kept in that position when the machine or instrument is not in use, the raising of the needles being accomplished by the screw, as shown by H, Fig. 3. When the machine is in use, the needles being forced outward to their full extent by the screw H, and held in that position by the spiral spring, (the rod J, Figs. 3 and 10, being made to fit loosely in the cylinder K, to which the needle-plate is secured,) by placing the stamp on the package, the needles are forced upward, contracting the spiral spring. The cylinder holding the needle-plate works up the rod J. The pressure on the needles being removed, the spiral spring expands, allowing the cylinder K to fall down to its original position, and again leaving the needles in the position to pick up another stamp. Figs. 2, 4, 5, and 7, show the manner in which the top of the handle is to be secured, and at the same time allow the raising or depressing of the cylinder operating on the needles. Fig. 6 represents the face of the plate E and the position of the openings O O, through which the needles project.

I claim as my invention—

1. In a stamp-affixer, the picking-up needles F, arranged as described.

2. The combination of the adjustable needles F, needle-plate L, spring M, cylinder K, rods I J arranged in the cylinder B, having the plate E at its base, and the cap A, the whole operating in the manner and for the purpose described.

RAPHAEL P. THIAN.

Witnesses:
RICHARD J. BLAKELOCK,
JEREMIAH C. ALLEN.